United States Patent Office 3,470,105
Patented Sept. 30, 1969

3,470,105
METHOD FOR THE PRODUCTION OF A SUPPORTED CHROMIUM-COBALT-PALLADIUM OXIDE EXHAUST CATALYST
Warren S. Briggs, Silver Spring, Md., William A. Stover, Pitman, N.J., and John L. Warthen, Baltimore, Md., assignors to W. R. Grace & Co., New York, N.Y., a corporation of Connecticut
No Drawing. Original application Feb. 1, 1963, Ser. No. 255,658. Divided and this application Mar. 2, 1967, Ser. No. 641,392
Int. Cl. B01j *11/46;* C01b *13/10*
U.S. Cl. 252—455           4 Claims

ABSTRACT OF THE DISCLOSURE

A method of producing an exhaust gas catalyst comprises the consecutive impregnation of a support with chromium and with cobalt-palladium salt solutions, said impregnations being separated by a drying step and followed by calcination.

---

This application is a division of my earlier filed application Ser. No. 255,658, now abandoned.

This invention relates to an auto exhaust catalytic system. In one particular aspect, it relates to a catalyst having improved hydrocarbon conversion activity and increased thermal stability.

The air pollution problem is not new. However, in recent years the problem has become aggravated. The air in most cities contains substantial amounts of oxides of nitrogen and products of the incomplete combustion of organic fuels. In the presence of sunlight, photolysis of the oxides of nitrogen leads to the formation of measurable quantities of ozone. The ozone, in turn, reacts with various organic pollutants to form compounds which can cause the many undesirable manifestations of smog, such as eye irritation, visibility reduction and plant damage.

When meteorological conditions prevent the rapid dispersion of organic pollutants, a smog condition results. Furthermore, it is now known that in many cities, a major portion of organic pollutants are derived from unburned or partially burned gasoline in auto exhaust.

Carbon monoxide is another pollutant of much concern because of its toxic nature. It also is derived mainly from exhaust emissions.

Numerous attempts have been made since the advent of the automobile to render harmless and unobjectionable the exhausts from internal combustion engines. Various filters, mufflers, etc. have been designed in an effort to solve this problem. To date, none have met with success complete enough for practical application. One of the main problems is that systems which appear to work initially very quickly become contaminated and consequently useless. It is not feasible to install catalytic systems which must be periodically removed and rejuvenated because of the cost involved.

It has been realized that the only practical way to treat exhaust fumes to reduce air pollution is to oxidize hydrocarbons to carbon dioxide and water and to oxidize carbon monoxide to carbon dioxide.

A wide selection of oxidation catalysts has been produced in the past varying both in chemical composition and physical structure. With respect to chemical composition, the ability of a wide variety of metals and metal oxides, either alone or in combination, to catalyze the complete oxidation of hydrocarbons has been noted.

To be adequately efficient in the removal of hydrocarbons and carbon monoxides from auto exhaust gases and to meet the standards of maximum emission currently under consideration in the legislatures of the various states, the catalyst for treating exhaust gases must become efficient within a very few minutes after engine start-up and must maintain its activity throughout the various modes of engine operation. A catalytic converter must maintain its catalytic activity for a period of not less than one year and preferably for two years or 20,000 miles of engine operation. The problem of excessively high temperatures which are obtained when high concentrations of pollutants are being oxidized must also be solved in this system. It is not unusual for catalyst temperatures to reach 1600° F. or higher. A normal catalytic system cannot withstand prolonged exposure to these temperatures without degradation of the catalyst.

The catalytic systems which have been devised to give satisfactory results for carbon monoxide conversion frequently suffer from relatively poor conversion of hydrocarbons. Since the ideal catalytic system gives a good conversion of both of these exhaust gas components, this problem is of prime importance.

We have found that an auto exhaust catalyst with good hydrocarbon conversion and carbon monoxide conversion activity can be prepared by combining chromia with a cobalt oxide-palladium oxidation catalyst.

The addition of palladium to the cobalt oxide type catalyst has a promotional effect. It is added to improve the cold start activity of the catalyst. The chromia is found to greatly improve the hydrocarbon activity of the catalyst. The addition of 1 to 20% chromia ($Cr_2O_3$) definitely has a beneficial effect.

Broadly speaking, our process consists of selecting a suitable support, preferably in the form of nodules with a high surface area. The preferred size of these nodules is about 5 to 8 mesh or 8 to 10 mesh (the Tyler Standard Screen Scale). However, satisfactory results are obtained when the nodules have diameters of 3 to 10 mesh. After the support has been selected, it is impregnated with a soluble chromia source. The chromia impregnation is carried out so that the final catalyst will contain about 1 to 20 weight percent $Cr_2O_3$. Suitable chromia salts for this impregnation include ammonium chromate, $(NH_4)_2CrO_4$; chromic acid, $H_2CrO_4$; chromic acetate, $Cr_2(C_2H_3O_2)_6 \cdot H_2O$, etc. The chromia-treated base is dried for a short period of time at about 260° F.

A second impregnation is then carried out with a cobalt salt-palladium salt solution. This solution is made up to prepare a final catalyst containing 4 to 16 weight percent cobalt oxide and 0.01 to 0.1 weight percent palladium. After the second impregnation, the drying step is repeated and the catalyst particles are then heated to about 1400° F. for from 3 to 19 hours in an atmosphere of air, steam, or a mixture of the two.

The basic step in the preparation of the catalyst is the selection of a suitable base. The base or support for the catalyst should have a high surface area and be relatively porous material in order that maximum activity will be exhibited by the catalytic components. The support should also have good strength properties to avoid the problem of excessive attrition. Examples of suitable supports include alumina, silica-alumina, silica-magnesia, zirconia, zirconia-alumina, zirconia-magnesia, etc.

Particularly good results are obtained in using a gamma-type alumina as the catalyst support. This support may be used in a powdered, granulated, pilled or extruded form. A particularly desirable support is the gamma type alumina which is commercially available in the form of nodules. These nodules have a very desirable combination of properties. The crushing strength is quite high. They are porous and have a high surface area.

The size of the nodules also has some bearing on the activity of the catalyst. The preferred size of these nodules is about 5 to 8 mesh (The Tyler Standard Screen Scale).

After the base has been selected, it is impregnated with a sufficient quantity of a chromium salt solution to deposit 1 to 20 weight percent and preferably 4 to 10 weight percent chromia on the catalyst. The chromia substantially improves the hydrocarbon activity of both the fresh catalyst (calcined 3 hours at 1400° F.) and the thermally aged catalyst (calcined an additional 16 hours at 1400° F.). The chormia is particularly beneficial when alumina is used as the catalyst support. The chormia coats the alumina and minimizes the formation of essentially inactive cobaltous and cobaltic aluminate. It also tends to keep the cobalt in its more active form, i.e., the cobaltic state. To reduce the reaction of cobalt with the alumina base most effectively, the chromia is added prior to the cobalt-palladium impregnation. However, it is also effective for this purpose if it is added at some other stage in the preparation. After the chromia impregnation, the wet nodules are dried at 260° F. in air.

After the nodules are dried, they are impregnated with a cobalt salt-palladium salt solution. The cobalt and palladium salts are present in amounts sufficient to furnish a final catalyst with 4 to 16 weight percent cobalt oxide and 0.01 to 0.1 weight percent palladium. Any of the known soluble cobalt salts can be used in the preparation of the catalyst. Suitable examples include the acetate, bromide, chloride, cyanide, sulfate, thiocyanate, etc. Because of its availability and comparatively low cost, the preferred salt is the nitrate. Suitable palladium salts for this preparation include palladium bromide, palladium chloride, palladium fluoride, palladium nitrate, palladium sulfate, etc.

After the cobalt salt-palladium salt impregnation, the nodules are again dried at 260° F. in air, steam or a mixture of air and steam.

The final step in the process is calcination. Generally, 3 to 19 hours at about 1400° F. is sufficient.

The catalyst prepared according to this invention exhibits good thermal stability and excellent hydrocarbon activity.

The catalysts were evaluated by determining the percent conversion of a mixture containing 3.85% carbon monoxide, 1000 parts per million of normal hexane, 4.5% oxygen, 10% water and the balance nitrogen.

The gases were passed through the catalyst at a gaseous hourly space velocity of 5000 volumes of gas per volume of catalyst per hour.

The activity index of the catalyst for either carbon monoxide or hydrocarbon conversion is determined by measuring the area under an activity curve in the range of the average catalyst temperature, 350–850° F., and calculating what percentage this area constitutes of the area under the ideal activity curve. "Ideal" activity is defined as 100% conversion throughout this temperature range. Thus, the activity index may vary from 0, which indicates no activity, to 100 which would indicate so-called "ideal" activity.

Our invention will be further explained by the following specific but non-limiting examples.

Example I

A generally useful method of preparing the catalyst of our invention is illustrated in this example.

The chromia impregnating solution was prepared by dissolving 83.0 grams of ammonium chromate in 350 cc. of deionized water. This solution was then used to impregnate 885 grams of commercially available alumina monohydrate nodules. The wet nodules were dried at 260° F.

The cobalt-palladium impregnating mixture was prepared by mixing 3.0 cc. of a 10% $Pd(NO_3)_2$ solution with 388.0 grams of $Co(NO_3)_2 \cdot 6H_2O$. The impregnation was carried out by mixing the material with the hot nodules just as they came out of the drying oven at 260° F. and allowing the salts to melt onto the support.

The nodules were again dried at 260° F. and then calcined for 3 hours at 1400° F.

The final catalyst contained 5 weight percent $Cr_2O_3$, 10 weight percent CoO and 0.03 weight percent Pd.

Example II

In this run a catalyst containing 7.5% chromia was prepared.

A quantity of 860 grams of alumina monohydrate nodules was impregnated with a solution containing 124.0 grams of $(NH_4)_2Cr_2O_7$ in 350 cc. of deionized water. The wet nodules were dried at 260° F.

The hot nodules were reimpregnated just as they came from the oven by allowing a mixture of 388.0 grams of $Co(NO_3)_2 \cdot 6H_2O$ and 3.0 cc. of a 10% $Pd(NO_3)_2$ solution to melt onto the hot support. The nodules were again dried at 260° F. and then calcined for 3 hours at 1400° F.

The composition of the final catalyst was 7.5 weight percent $Cr_2O_3$, 10.0 weight percent CoO and 0.03 weight percent Pd.

Example III

A catalyst was prepared in this run to contain 10.0% $Cr_2O_3$.

A total of 834 grams of alumina monohydrate nodules was impregnated with 166.0 grams of $(NH_4)_2Cr_2O_7$ The wet nodules were dried at 260° F.

The hot nodules were then impregnated with a mixture containing 388.0 grams of $Co(NO_3)_2 \cdot 6H_2O$ and 3.0 cc. of a 10% $Pd(NO_3)_2$ solution. The mixture was allowed to melt onto the hot support. The nodules were then re-dried at 260° F. and finally calcined for 3 hours at 1400° F.

The composition of the final product was 10.0 weight percent $Cr_2O_3$, 10 weight percent CoO and 0.03 weight percent Pd.

Example IV

In this run, a slightly modified technique was used to prepare the catalyst.

250 grams of alumina monohydrate nodules were impregnated with 49.6 grams of $(NH_4)_2Cr_2O_7$ and enough deionized water to bring the mass to incipient wetness. The nodules were then dried at 260° F.

The hot base was reimpregnated with a melted solution of 117 grams of $Co(NO_3)_2 \cdot 6H_2O$ and 0.9 ml. of 10% $Pd(NO_3)_2$ solution. The impregnated nodules were dried at 260° F. and calcined for 3 hours at 1400° F.

The product contained 10 weight percent $Cr_2O_3$, 10 weight percent CoO and 0.03 weight percent Pd.

Example V

In this series of runs, a one step impregnation technique was used to prepare catalysts with zirconia as a support.

A total of 89 grams of zirconia pills was impregnated with a solution containing 38.9 grams of $Co(NO_3)_2 \cdot 6H_2O$, 0.3 cc. of a 10% $Pd(NO_3)_2$ solution and 1.33 grams of $CrO_3$.

The mass was dried at 260° F. and calcined for 3 hours at 1400° F.

The final composition of the catalyst was 10.0 weight percent CoO, 0.03 weight percent Pd and 1.0 weight percent $Cr_2O_3$.

A second catalyst was prepared using the same technique and conditions.

A solution containing 38.9 grams of $Co(NO_3)_2 \cdot 6H_2O$, 0.3 cc. of a 10% $Pd(NO_3)_2$ solution and 3.95 grams of $CrO_3$ was used to impregnate 87 grams of zirconia pills. The impregnated base was dried at 260° F. and then calcined for 3 hours at 1400° F.

The product contained 10 weight percent CoO, 0.03 weight percent Pd and 3.0 weight percent $Cr_2O_3$.

These two catalysts, containing 1 and 3 weight percent $Cr_2O_3$, were combined in such proportions that the active ingredients were present in amounts equal to 10.0 weight percent CoO, 0.03 weight percent Pd and 2.0 weight percent $Cr_3O_2$.

Example VI

A catalyst containing no chromia was prepared according to the technique decribed in Example I. This catalyst was compared with those containing chromia in order to demonstrate the superior performance of the catalysts of our invention.

An 885 gram quantity of alumina monohydrate nodules was heated to 260° F. The nodules were then impregnated with a mixture containing 388.0 grams of $Co(NO_3)_2 \cdot 6H_2O$ and 3.0 cc. of a 10% $Pd(NO_3)_2$ solution by allowing the mix to melt onto the hot support.

The material was then dried at 260° F. and finally calcined for 3 hours at 1400° F.

The final catalyst contained 10.0 weight percent CoO, and 0.03 weight percent Pd.

Example VII

The performance of the catalyst of our invention was evaluated by measuring the hydrocarbon and carbon monoxide conversions of the individual catalysts and by determining the activity indices by the tests described previously.

The results of these tests are set out below:

A total of 660 ccs. of catalyst was placed in the muffler which had a diameter of 3 inches. The muffler was inserted in the exhaust line in such a manner that it acted as a downflow reactor. Thermocouples were placed at various points through the catalyst beds of the muffler. The amount of carbon monoxide being passed through the muffler was varied by adjusting the carburetor to maintain the maximum catalyst temperature between 1400 and 1450° F. Excess air was added to insure complete combustion, t,h,at, is, about 0.3 to 1.2 standard cubic feet per minute. Usually, the time for this test is about 93 to 100 hours. However, it will be seen from the data below that the catalyst with no chromia failed at 25 hours. The chromia catalyst was tested for the 93 to 100 hour period.

The evaluations of the catalysts were made on the basis of activity of the catalysts for hydrocarbon and carbon monoxide conversion before and after the time in the muffler of the single cylinder engine. The comparative data was collected using the catalyst of this invention prepared to contain 5.0 weight percent $Cr_2O_3$, 10.0 weight percent CoO and 0.03 weight percent Pd on alumina nodules (designated Catalyst A) and a cobalt oxide-palladium catalyst containing no chromia (designated Catalyst B). This catalyst contained 13.0 weight percent

TABLE I

| | Example | | | | | |
|---|---|---|---|---|---|---|
| | I | II | III | IV | V | VI |
| Wt. percent $Cr_2O_3$ | 5.0 | 7.5 | 10.0 | 10.0 | 3.0 | 0.0 |
| Wt. percent CoO | 10.0 | 10.0 | 10.0 | 10.0 | 10.0 | 10.0 |
| Wt. percent Pd | 0.03 | 0.03 | 0.03 | 0.03 | 0.03 | 0.03 |
| Percent conversion of hydrocarbons at 750° F | 92 | 95 | 98 | 99 | 96 | 67 |
| Activity index: | | | | | | |
| Carbon monoxide | 73.2 | 71.6 | 64.2 | 74.9 | 74.2 | 73.7 |
| Hydrocarbons | 50.4 | 48.6 | 51.5 | 66.0 | 47.9 | 33.2 |

These data clearly show the improved performance in hydrocarbon conversion shown by the catalyst of this invention. The conversion is about 30% greater at 750° F. than the catalyst without chromia.

The effect of the greater hydrocarbon conversion is particularly obvious from the hydrocarbon activity index.

The carbon monoxide activity index is roughly the same for the catalysts with and without chromia.

Example VIII

The superior performance of the catalyst of our invention was shown by comparing the catalyst prepared in Example I with an auto exhaust catalyst which contained 13 weight percent CoO and 0.04 weight percent Pd on alumina nodules.

In this series of runs, the catalysts were evaluated in a muffler system in which the exhaust gases passed from the top to the bottom of the system. The catalysts were subjected to actual operating conditions by placing the catalysts on screens in the two beds of the muffler where one catalyst is above the other. The exhaust stream of a single cylinder engine and auxiliary air were passed through the catalyst beds.

The engine was operated on a commercial premium gasoline containing 3.0 ml. of tetraethyl lead per gallon. The engine used in the test was a Palmer PW–27 water cooled single cylinder engine with a bore of 3.25 inches and a displacement of 27 cubic inches. The engine was automatically controlled to operate on a repetitive two minute cycle consisting of approximately 30 seconds at idle (500 r.p.m.) and 90 seconds at cruise (1800 r.p.m.).

CoO and 0.04 weight percent Pd on alumina nodules. The data is set out in Table II below:

TABLE II

| | Activity indices | | | | |
|---|---|---|---|---|---|
| | Fresh | | | After 93 to 100 hours in the muffler | |
| Catalyst | CO | Hydrocarbons | | CO | Hydrocarbons |
| A | 73.2 | 50.4 | First bed | 27.7 | 18.7 |
| | | | Second bed | 41.6 | 23.4 |
| B | 76.3 | 32.4 | First bed | [1] 11.3 | [1] 11.8 |
| | | | Second bed | [1] 4.5 | [1] 0 |

[1] These values are at the end of 25 hours. This catalyst was completely deactivated at that time.

The advantages of the chromia in our catalyst are shown by a comparison of the data on the activity of Catalysts A and B. Catalyst A retains its activity when exposed to operating conditions as long as 93 to 100 hours. Catalyst B, on the other hand, loses activity completely after 25 hours.

The data also show that the catalyst of our invention has good resistance to effects of lead in the exhaust gases. The activity remains good even after long exposure to lead.

We claim:

1. A method for preparing a catalyst suitable for use in a catalytic system for oxidation of air pollutants in auto exhaust gases which comprises adding a sufficient quantity of a chromium salt solution to give a final catalyst containing to 20 weight percent chromia to a support selected from the group consisting of alumina, silica-alumina, silica-alumina-magnesia, and zirconia, drying the wet support, reimpregnating the material with a solution containing sufficient cobalt salt to provide a final catalyst containing 4 to 16 weight percent cobalt oxide and sufficient palladium salt to provide a final catalyst containing 0.01 to 0.1 weight percent Pd, drying the wet support, calcining the dried catalyst at about 1400° F. for about 3 to 19 hours and recovering the catalyst for use in the system.

2. A process according to claim 1 wherein the cobalt salt is selected from the group consisting of the acetate, bromide, chloride, cyanide, nitrate, sulfate and thiocyanate.

3. A process according to claim 1 wherein the chromium salt is selected from the group consisting of ammonium chromate, chromic acid ammonium dichromate and chromic acetate.

4. A process according to claim 1 wherein the palladium salt is selected from the group consisting of palladium bromide, palladium chloride, palladium fluoride, palladium nitrate and palladium sulfate.

References Cited

UNITED STATES PATENTS 3,133,029   5/1964   Hoekstra _____ 252—466

DANIEL E. WYMAN, Primary Examiner

PHILIP M. FRENCH, Assistant Examiner

U.S. Cl. X.R.

23—2.2; 252—465